US011887634B2

(12) United States Patent
Watanabe

(10) Patent No.: US 11,887,634 B2
(45) Date of Patent: Jan. 30, 2024

(54) MAGNETIC DISK DEVICE AND CONTROL METHOD OF MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Toru Watanabe, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/931,707

(22) Filed: Sep. 13, 2022

(65) Prior Publication Data
US 2023/0306992 A1 Sep. 28, 2023

(30) Foreign Application Priority Data
Mar. 24, 2022 (JP) ................................ 2022-048222

(51) Int. Cl.
*G11B 5/60* (2006.01)
*G11B 5/127* (2006.01)

(52) U.S. Cl.
CPC ............ *G11B 5/1278* (2013.01); *G11B 5/607* (2013.01); *G11B 5/6029* (2013.01)

(58) Field of Classification Search
CPC .................................................. G11B 360/75
See application file for complete search history.

(56) References Cited

U.S. PATENT DOCUMENTS

| 6,963,464 | B2* | 11/2005 | Xu ........................ G11B 5/607 |
| 7,292,401 | B2 | 11/2007 | Shen et al. |
| 7,400,473 | B1* | 7/2008 | Krajnovich .......... G11B 5/6064 |
| 7,474,504 | B2 | 1/2009 | Xu et al. |
| 7,835,104 | B2 | 11/2010 | Yamashita et al. |
| 9,595,278 | B1 | 3/2017 | Martin |
| 10,867,624 | B1 | 12/2020 | Watanabe et al. |

FOREIGN PATENT DOCUMENTS

| JP | 2007-250170 A | 9/2007 |
| JP | 4379814 B2 | 12/2009 |
| JP | 2021-044031 A | 3/2021 |

* cited by examiner

*Primary Examiner* — K. Wong
(74) *Attorney, Agent, or Firm* — Knobbe, Martens, Olson & Bear, LLP

(57) ABSTRACT

A magnetic disk device of an embodiment includes: a head structure including at least one reproducing head and main magnetic pole gap installation portion behind a flying slider and including at least two thermal actuators; and a control unit that can independently control the thermal actuators and that sets spacing of the reproducing head and the main magnetic pole gap installation portion with respect to a recording medium by setting a rotational speed at the time of contact, which rotational speed is a rotational speed of the recording medium, to be lower than a normal rotational speed when the reproducing head and the main magnetic pole gap installation portion are brought into contact with the recording medium.

8 Claims, 6 Drawing Sheets

MAGNETIC DISK DEVICE AND CONTROL METHOD OF MAGNETIC DISK DEVICE

CROSS-REFERENCE TO RELATED APPLICATIONS

This application is based upon and claims the benefit of priority from Japanese Application No. 2022-048222, filed on Mar. 24, 2022, the entire contents of which are incorporated herein by reference.

FIELD

Embodiments described herein relate generally to a magnetic disk device and a control method of the magnetic disk device.

BACKGROUND

In a magnetic disk device, it is necessary to reduce a gap between a reproducing/recording head and a recording medium in order to improve recording density, specifically linear recording density. In order to reduce the gap, a technique of providing a thermal actuator around a reproducing head and a main magnetic pole gap installation element mounted on a flying slider, and of operating the reproducing head and the main magnetic pole gap installation element with desired spacing from a magnetic disk, which is a recording medium, by the thermal actuator is used.

Incidentally, in order to accurately set the spacing, protruding amounts of the reproducing head and the main magnetic pole gap installation element are increased by the thermal actuator and contact with the recording medium is made once.

Then, the thermal actuator is generally controlled in such a manner that the spacing from the recording medium becomes a desired amount with reference to a reproduction signal or the like from the recording medium on the basis of a contact state.

Although a protruding shape of a main magnetic pole gap installation portion depends on the number of thermal actuators and a structure of an element portion, for example, in a case of considering a recording operation, it is necessary to bring the main magnetic pole gap installation portion close to a recording medium. Thus, as a matter of course, the protruding shape is designed in such a manner that the main magnetic pole gap installation portion becomes the closest to the recording medium.

Thus, since the main magnetic pole gap installation portion is protruded when contact with the recording medium is made, there is a possibility of damage in the vicinity of the main magnetic pole gap installation portion, such as wear of the main magnetic pole gap installation portion.

Thus, a method of protecting the main magnetic pole gap installation element from damage such as wear at the time of contact reference measurement is desired.

DETAILED DESCRIPTION

A magnetic disk device of an embodiment includes: a head structure including at least one reproducing head and main magnetic pole gap installation portion behind a flying slider and including at least two thermal actuators; and a control unit that can independently control each of the thermal actuator and that sets spacing of the reproducing head and the main magnetic pole gap installation portion with respect to a recording medium by setting a rotational speed at the time of contact, which rotational speed is a rotational speed of the recording medium, to be lower than a normal rotational speed when the reproducing head and the main magnetic pole gap installation portion are brought into contact with the recording medium.

Next, a hard disk drive (HDD) according to the embodiment will be described in detail as an example of a disk device.

Figure 1:
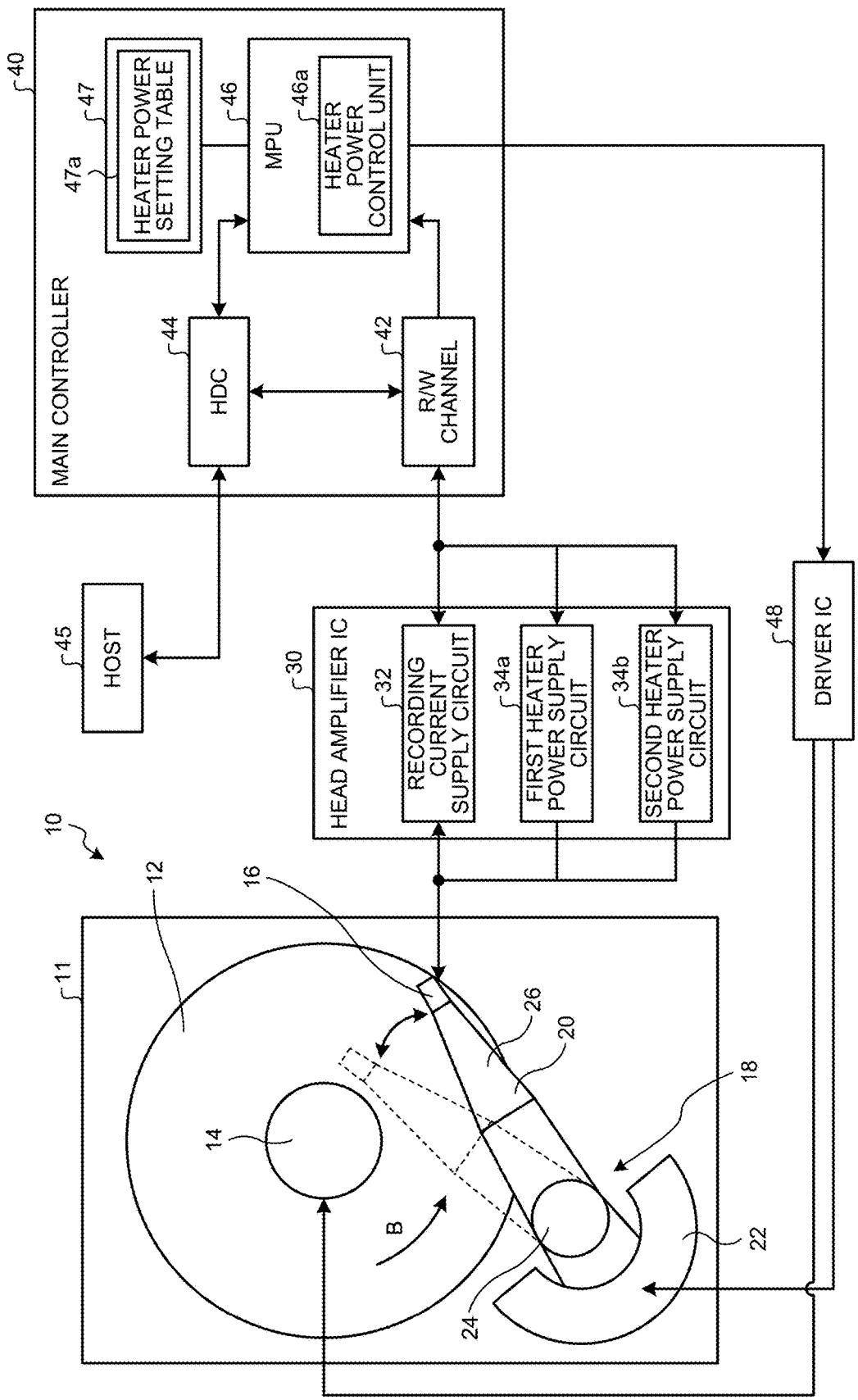
FIG. 1 is a block diagram schematically illustrating a magnetic disk device (HDD) according to an embodiment.

FIG. 1 is a block diagram schematically illustrating the magnetic disk device (HDD) according to the embodiment.

Figure 2A:
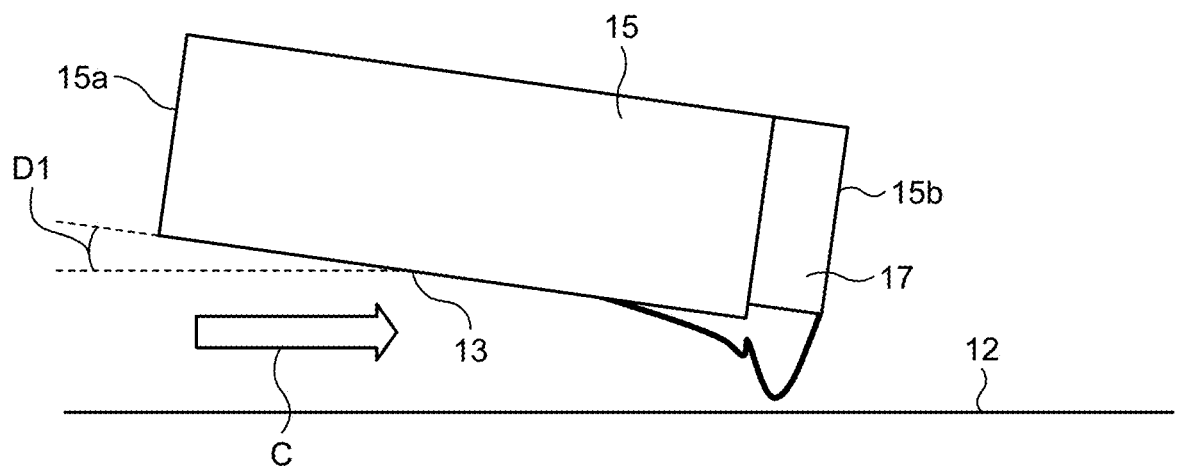
FIG. 2A and FIG. 2B are side views illustrating a magnetic head in a flying state and a magnetic disk.
Figure 2B:
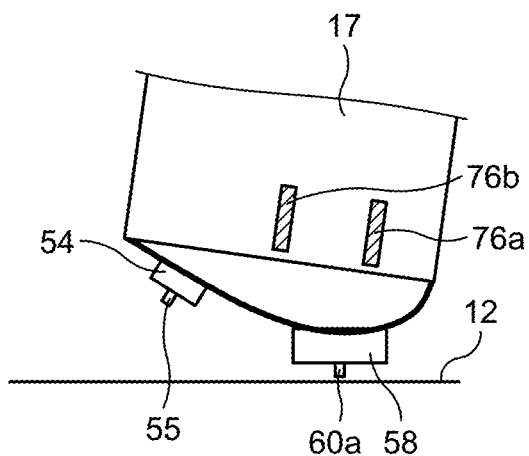

FIG. 2A and FIG. 2B are side views illustrating a magnetic head and a magnetic disk in a flying state.

As illustrated in FIG. 1, the magnetic disk device 10 includes a rectangular housing 11, a magnetic disk 12 as a recording medium arranged in the housing 11, a spindle motor 21 that supports and rotates the magnetic disk 12, and a plurality of magnetic head 16 that performs recording (writing) and reproducing (reading) of data on the magnetic disk 12.

In addition, the magnetic disk device 10 includes a head actuator 18 that moves and positions each of the magnetic head 16 on an arbitrary track on the magnetic disk 12. The head actuator 18 includes a carriage assembly 20 that movably supports each of the magnetic head 16, and a voice coil motor (VCM) 22 that rotates the carriage assembly 20.

The magnetic disk device 10 further includes a head amplifier IC 30 that drives the magnetic head 16, a main controller 40, and a driver IC 48.

The head amplifier IC 30 is provided, for example, in the carriage assembly 20 and is electrically connected to each of the magnetic head 16.

The head amplifier IC 30 includes a recording current supply circuit (recording current supply unit) 32 that supplies a recording current to a recording coil of each of the magnetic head 16, a first heater power supply circuit 34a and a second heater power supply circuit 34b that supply drive power to a thermal actuator (heater) of each of the magnetic head 16 (described later), an amplifier (not illustrated) that amplifies a signal read by each of the magnetic head 16, and the like.

The main controller 40 and the driver IC 48 are provided, for example, on a control circuit board (not illustrated) provided on a back side of the housing 11.

The main controller 40 includes an R/W channel 42, a hard disk controller (HDC) 44, a microprocessor (MPU) 46, a memory 47, and the like.

The main controller 40 is electrically connected to each of the magnetic head 16 via the head amplifier IC 30, and controls each of the magnetic head 16.

In addition, the main controller 40 is electrically connected to the VCM 22 and the spindle motor 21 via the driver IC 48, and controls the VCM 22 and the spindle motor 21.

The HDC 44 can be connected to a host computer 45.

The memory 47 of the main controller 40 stores a heater power setting table 47a and the like (described later). In the main controller 40, for example, the MPU 46 includes a heater power control unit 46a that adjusts power to be supplied to the thermal actuators on the basis of the heater power setting table 47a.

As illustrated in FIG. 1 and FIGS. 2A and 2B, the magnetic disk 12 is configured as a perpendicular magnetic recording medium. The magnetic disk 12 includes, for example, a substrate made of a non-magnetic material formed in a disk shape having a diameter of 96 mm (about 3.5 inches). On each surface of this substrate, a soft magnetic layer made of a material exhibiting a soft magnetic characteristic is stacked as an underlayer, and a perpendicular magnetic recording layer having magnetic anisotropy in a direction perpendicular to a surface of the magnetic disk 12, and a protective film are sequentially stacked thereon.

The magnetic disk 12 is coaxially fitted to a hub of the spindle motor 21. The magnetic disk 12 is rotated in a predetermined direction at a predetermined speed by the spindle motor 21.

The carriage assembly 20 includes a bearing portion 24 rotatably supported by the housing 11, and a plurality of pieces of suspension 26 extending from the bearing portion 24.

As illustrated in FIGS. 2A and 2B, the magnetic head 16 is respectively supported by extending ends of the suspensions 26. Each of the magnetic head 16 is electrically connected to the head amplifier IC 30 via a wiring member (flexure) 28 provided in the carriage assembly 20.

As illustrated in FIG. 2A, each of the magnetic head 16 is configured as a flying head, and includes a slider 15 formed in a substantially rectangular parallelepiped shape, and a head portion 17 formed at an end on an outflow end (trailing) side of the slider 15.

The slider 15 is formed of, for example, a sintered body of alumina and titanium carbide (AlTiC), and the head portion 17 is formed of a plurality of thin films.

The slider 15 is attached to a gimbal portion of a wiring member (not illustrated).

The slider 15 has a substantially rectangular disk facing surface (air bearing surface (ABS)) 13 facing a surface of the magnetic disk 12.

The slider 15 is maintained in a state of flying at a predetermined height from the surface of the magnetic disk 12 by an air flow C generated between the disk surface and the disk facing surface 13 by rotation of the magnetic disk 12. A direction of the air flow C coincides with a rotation direction of the magnetic disk 12.

The slider 15 has a leading end 15a located on an inflow side of the air flow C, and a trailing end 15b located on an outflow side of the air flow C. With the rotation of the magnetic disk 12, the magnetic head 16 travel in a direction opposite to the rotation direction of the magnetic disk 12 with respect to the magnetic disk 12.

Note that in a state in which each of the magnetic head 16 is flying, the disk facing surface 13 of the slider 15 is inclined at a first pitch angle (flying pitch (inclination angle)) D1 with respect to the surface of the magnetic disk 12.

FIG. 2B is an enlarged cross-sectional view illustrating a tip portion of a recording head.

As illustrated in FIG. 2B, the head portion 17 includes a reproducing head (read head) 54 and a recording head (write head) 58 formed at the trailing end 15b of the slider 15 by a thin film process, and is formed as a separable-type magnetic head.

The reproducing head 54 and the recording head 58 are covered with a non-magnetic protective insulating film 53 except for a portion exposed to the disk facing surface 13 of the slider 15. The protective insulating film 53 is included in an outer shape of the head portion 17.

Furthermore, the head portion 17 includes a first thermal actuator that controls a protruding amount of the recording head 58, and a second thermal actuator that controls a protruding amount of the reproducing head 54.

The first thermal actuator includes, for example, a heater 76a. The heater 76a is embedded in the protective insulating film 53 and is located in the vicinity of the recording head 58.

The second thermal actuator includes, for example, a heater 76b. The heater 76b is embedded in the protective insulating film 53 and is located in the vicinity of the reproducing head 54.

It is defined that a longitudinal direction of a recording track formed in the perpendicular magnetic recording layer of the magnetic disk 12 is a down track direction, and a width direction of the recording track which direction is orthogonal to the longitudinal direction is a cross track direction.

A magnetoresistive effect element 55 protrudes from the reproducing head 54.

As illustrated in FIG. 2B, the recording head 58 is provided on a side of the trailing end 15b of the slider 15 with respect to the reproducing head 54.

Figure 3:
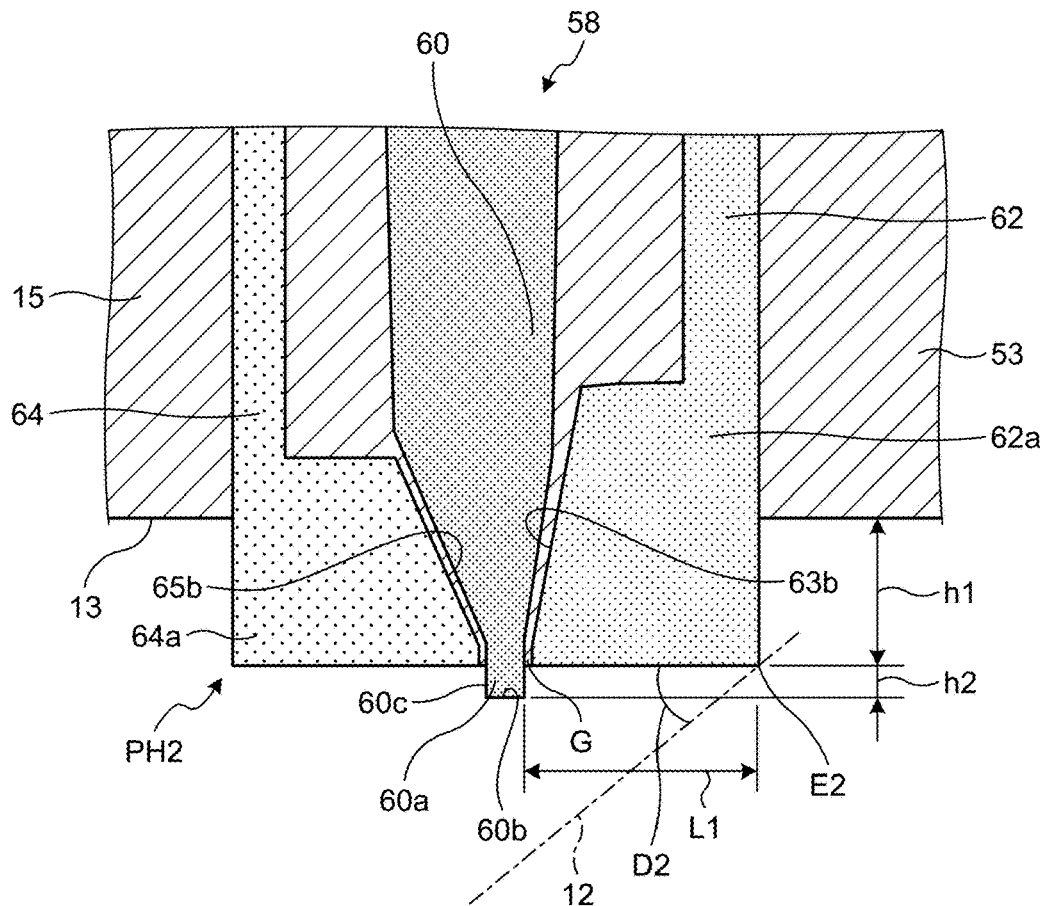
FIG. 3 is an enlarged cross-sectional view illustrating a tip portion of a recording head.

FIG. 3 is an enlarged cross-sectional view illustrating the tip portion of the recording head.

The recording head 58 includes a main magnetic pole 60 that generates a recording magnetic field in a perpendicular direction with respect to the surface of the magnetic disk 12, a trailing shield (first shield) 62 that is provided on a trailing side of the main magnetic pole 60 and that faces the main magnetic pole 60 with a write gap, a leading shield (second shield) 64 that faces a leading side of the main magnetic pole 60, and a pair of side shields (not illustrated) formed integrally with the trailing shield 62 and provided on both sides in the cross track direction CT of the main magnetic pole 60.

The main magnetic pole 60 and the trailing shield 62 are included in a first magnetic core forming a magnetic path, and the main magnetic pole 60 and the leading shield 64 are included in a second magnetic core forming a magnetic path. The recording head 58 includes a first recording coil wound around the first magnetic core, and a second recording coil wound around the second magnetic core.

The main magnetic pole 60 is formed of a soft magnetic material having high permeability and high saturation magnetic flux density, and extends substantially perpendicularly to the disk facing surface 13 as illustrated in FIG. 3. A main magnetic pole tip portion 60a on a side of the disk facing surface 13 of the main magnetic pole 60 is tapered toward the disk facing surface 13, and is formed in a columnar shape having a narrow width with respect to other portions. The main magnetic pole tip portion 60a of the main magnetic pole 60 slightly protrudes from the disk facing surface 13 of the slider 15.

The trailing shield 62 is formed of a soft magnetic material, and is provided to efficiently close the magnetic path through the soft magnetic layer of the magnetic disk 12 immediately below the main magnetic pole 60. The trailing shield 62 is formed in a substantially L shape, and a tip portion 62a thereof is formed in an elongated rectangular shape. The tip portion 62a of the trailing shield 62 slightly protrudes from the disk facing surface 13 of the slider 15.

The tip portion 62a has a rectangular tip surface (lower end surface) 63a extending in a manner of being substantially parallel to the disk facing surface 13, and a leading-side end surface (magnetic pole end surface) 63b facing the main magnetic pole tip portion 60a of the main magnetic pole 60 with a write gap G. The leading-side end surface 62b extends in a manner of being perpendicular to or slightly inclined from the disk facing surface 13.

The trailing shield 62 has a first connection portion 50 connected to the main magnetic pole 60.

The first connection portion 50 is magnetically connected to an upper portion of the main magnetic pole 60, that is, a portion of the main magnetic pole 60, which portion is away from the disk facing surface 13, via a non-conductor 52.

The first recording coil is wound around the first magnetic core. When a signal is written to the magnetic disk 12, a recording current is caused to flow through the first recording coil, whereby the first recording coil excites the main magnetic pole 60 and causes a magnetic flux to flow through the main magnetic pole 60.

The leading shield 64 formed of a soft magnetic material is provided on the leading side of the main magnetic pole 60 in such a manner as to face the main magnetic pole 60. The leading shield 64 is formed in a substantially L shape, and a tip portion 64a thereof on a side of the disk facing surface 13 is formed in an elongated rectangular shape. The tip portion 64a slightly protrudes from the disk facing surface 13 of the slider 15.

The tip portion 64a of the leading shield 64 has a rectangular tip surface (lower end surface) 65a extending substantially parallel to the disk facing surface 13, and a trailing-side end surface (magnetic pole end surface) 65b facing the main magnetic pole tip portion 60a of the main magnetic pole 60 with a gap.

In addition, the leading shield 64 has a second connection portion joined to the main magnetic pole 60 at a position separated from the disk facing surface 13. This second connection portion is, for example, formed of a soft magnetic material and is magnetically connected to an upper portion of the main magnetic pole 60, that is, a portion of the main magnetic pole 60, which portion is away from the disk facing surface 13, via a non-conductor.

As a result, the second connection portion 68 forms a magnetic circuit together with the main magnetic pole 60 and the leading shield 64. The second recording coil of the recording head 58 is wound around the second connection portion and applies a magnetic field to this magnetic circuit, for example.

As described above, the main magnetic pole tip portion 60a of the main magnetic pole 60, the tip portion 62a of the trailing shield 62, and the tip portion 64a of the leading shield 64 are included in a second protrusion portion PH2 slightly protruding from the disk facing surface 13.

In a non-adjustment state, that is, in a state in which no power is applied to the first heater 76a and the second heater 76b, the disk facing surface of the slider 15 is in a substantially flat state and is inclined at the first pitch angle (flying pitch angle) D1.

Then, when power is applied to the first heater 76a and the second heater 76b in a state in which first power supplied to the first heater 76a and second power supplied to the second heater 76b are maintained at a desired power ratio (first power>second power), the first heater 76a generates heat, and the recording head 58 and the protective insulating film 53 around the recording head are heated. Similarly, the second heater 76b generates heat, and the reproducing head 54 and the protective insulating film 53 around the reproducing head 54 are heated.

As a result, the recording head 58 and the protective insulating film 53 thermally expand more than the portion of the reproducing head 54 and bulge toward the surface of the magnetic disk 12. A second pitch angle (protrusion pitch angle) D2 of the second protrusion portion PH2 is positive. Note that with respect to the pitch angle, a direction in which a trailing-side edge E2 of the second protrusion portion PH2 is inclined in such a manner as to be located closer to a side of the magnetic disk 12 than the main magnetic pole tip portion 60a is positive. Conversely, a direction in which the trailing-side edge E2 is inclined in such a manner as to be farther from the magnetic disk 12 than the main magnetic pole tip portion 60a is negative.

In the above state, when power is applied to the first heater 76a and the second heater 76b at a desired power ratio (first power<second power), the portion of the reproducing head 54 bulges toward the surface of the magnetic disk 12 more than the portion of the recording head 58. In this case, the second pitch angle D2 of the second protrusion portion PH2 is negative.

In adjustment of a spacing amount, first, the main controller 40 that functions as the control unit increases the first power and the second power to increase the protruding amounts of the first protrusion portion PH1 and the second protrusion portion PH2 while maintaining the ratio of the first power supplied to the first heater 76a (first control amount) and the second power supplied to the second heater 76b (second control amount) (first power>second power), and brings the second protrusion portion PH2 into contact with the surface of the magnetic disk 12.

As a result, the trailing-side edge E2 of the second protrusion portion PH2, that is, the trailing-side edge E2 of the tip portion 62a of the trailing shield 62 comes into contact with the surface of the magnetic disk 12, and the second protrusion portion PH2 is inclined at a second pitch angle D2 with respect to the surface of the magnetic disk 12 in a contact state indicated by a dashed line in FIG. 3.

A protruding amount h2 of the main magnetic pole tip portion 60a in the second protrusion portion PH2, and a length L1 between the main magnetic pole tip portion 60a and the trailing-side edge E2 are set to satisfy a relational expression (A).

$$L1 \geq h2/(\text{first pitch angle } D1 + \text{second pitch angle } D2) \quad (A)$$

Thus, in a state in which the trailing-side edge E2 of the second protrusion portion PH2 is in contact with the surface of the magnetic disk 12, the main magnetic pole tip portion 60a of the main magnetic pole 60 is separated from the surface of the magnetic disk without being in contact with the magnetic disk 12.

That is, even in a case where the second protrusion portion PH2 is brought into contact with the magnetic disk 12, the main magnetic pole tip portion 60a of the main magnetic pole 60 is prevented from coming into contact with the magnetic disk 12, and wear and damage due to contact are prevented.

Incidentally, in the present embodiment, with respect to the reproducing head/main magnetic pole gap installation portion, in order to set desired spacing with respect to the recording medium, the protruding amount is made to increase and contact with the recording medium is made while the ratio of the control amounts of the first and second thermal actuators is maintained, whereby a reference of the spacing is measured.

At this time, the recording medium rotates at a constant speed. It has been known that a wear amount increases according to an increase in a rotational speed of the recording medium when a reproducing head/main magnetic pole gap installation portion element is continuously made to contact with the recording medium with a change in the rotational speed.

Figure 4:
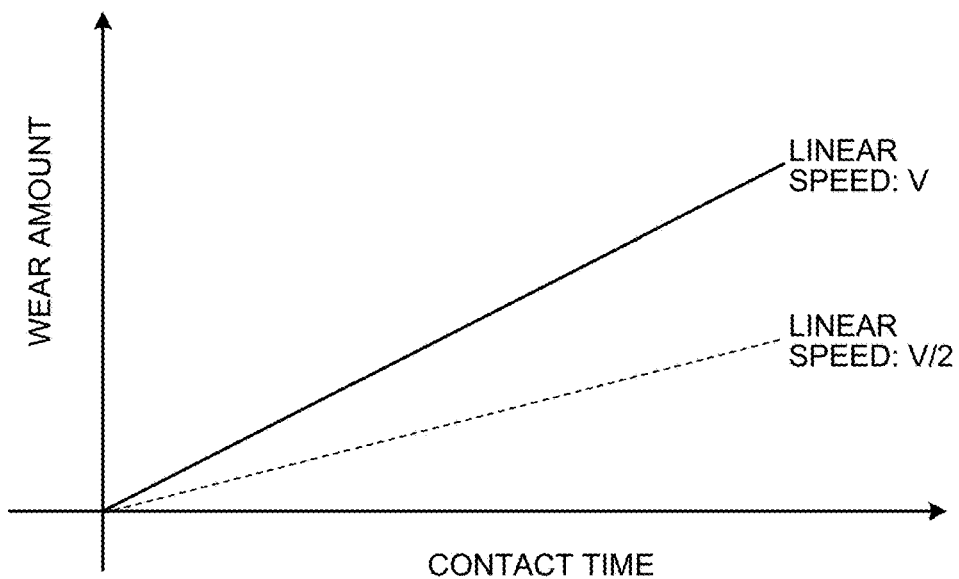
FIG. 4 is a graph for describing a relationship between a rotational speed and a wear amount.

FIG. 4 is a view for describing a relationship between the rotational speed and the wear amount.

More specifically, it can be understood that a wear amount of a case where a rotation is made with a rotational speed being a linear speed V is almost twice the wear amount of a case where the rotation is made at a linear speed V/2 at the same contact time.

Thus, in order to reduce the wear amount, it is the most effective to reduce the rotational speed of the recording medium. More specifically, in order to reduce the wear amount when the reproducing head/main magnetic pole gap installation portion is brought into contact with the recording medium, the wear amount can be reduced when the rotational speed of the recording medium is reduced to 5,400 RPM from 7,200 RPM used normally, for example.

However, when the rotational speed is unnecessarily lowered, the flying height of the flying slider cannot be appropriately maintained, and a normal operation cannot be performed.

Thus, in an actual product, it is desirable to calculate a lower limit for a decrease in the rotational speed and then set an appropriate rotational speed (rotational speed at the time of contact) when measuring a reference of spacing.

Figure 5:
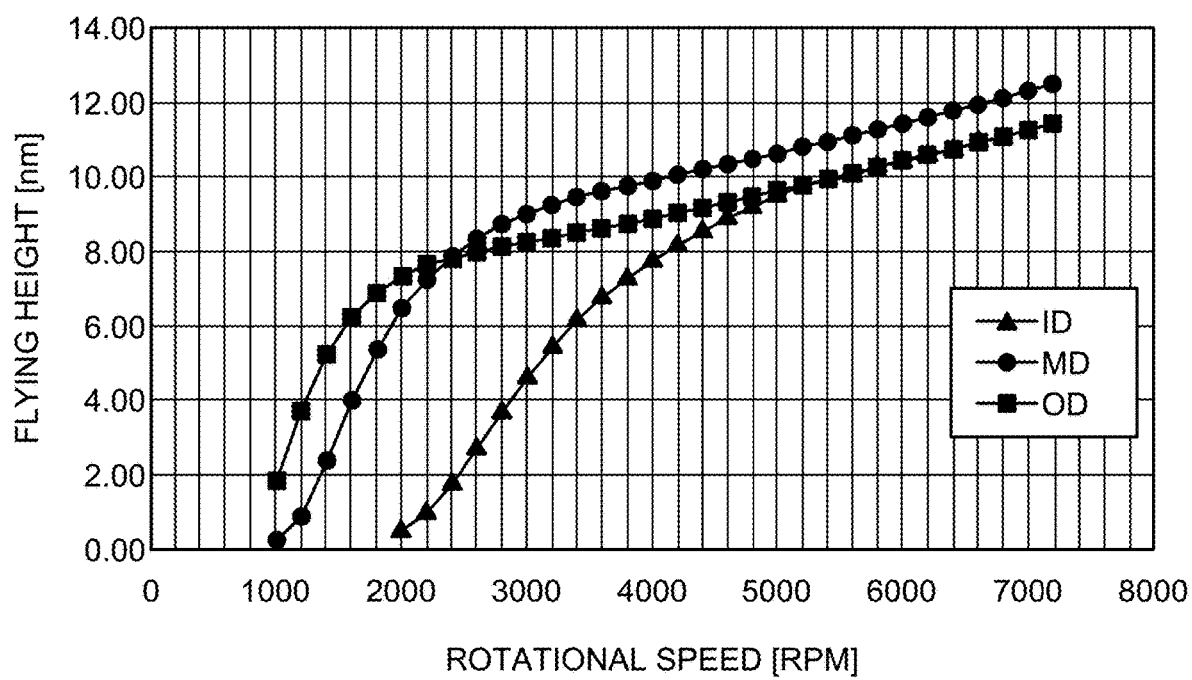
FIG. 5 is a graph for describing a calculation example of a decrease limit in a rotational speed.

FIG. 5 is a view for describing a calculation example of a decrease limit in a rotational speed.

In this case, a case where an allowable minimum average flying height of the flying slider is 8 nm will be considered.

In FIG. 5, a vertical axis represents the minimum average flying height of the outflow end of the flying slider, and a horizontal axis represents the rotational speed of the recording medium.

A result of measurement of the minimum average flying height of the flying slider at each of an inner circumferential position, an intermediate position, and an outer circumferential position of the recording medium is illustrated in FIG. 5.

Incidentally, in a case where an angular speed is constant, a linear speed becomes lower at the intermediate position than at the outer circumferential position, and becomes lower at the inner circumferential position than at the intermediate position.

Thus, it can be understood that an effective flying height of the flying slider is smaller at the inner circumferential position.

Thus, at the inner circumferential position, when the rotational speed at which the allowable minimum average flying height of the flying slider is, for example, 8 nm is calculated, 4200 rpm is the minimum rotational speed as illustrated in FIG. 5.

However, in consideration of disturbance such as vibration, and ease of control, the rotational speed is preferably higher than the calculated minimum rotational speed. For example, in a case where the minimum normal rotational speed of the magnetic disk device 10 in actual use is 5400 rpm, 5400 rpm is set as the rotational speed at the time of contact.

Next, an operation at the time of gap setting will be described.

Figure 6:
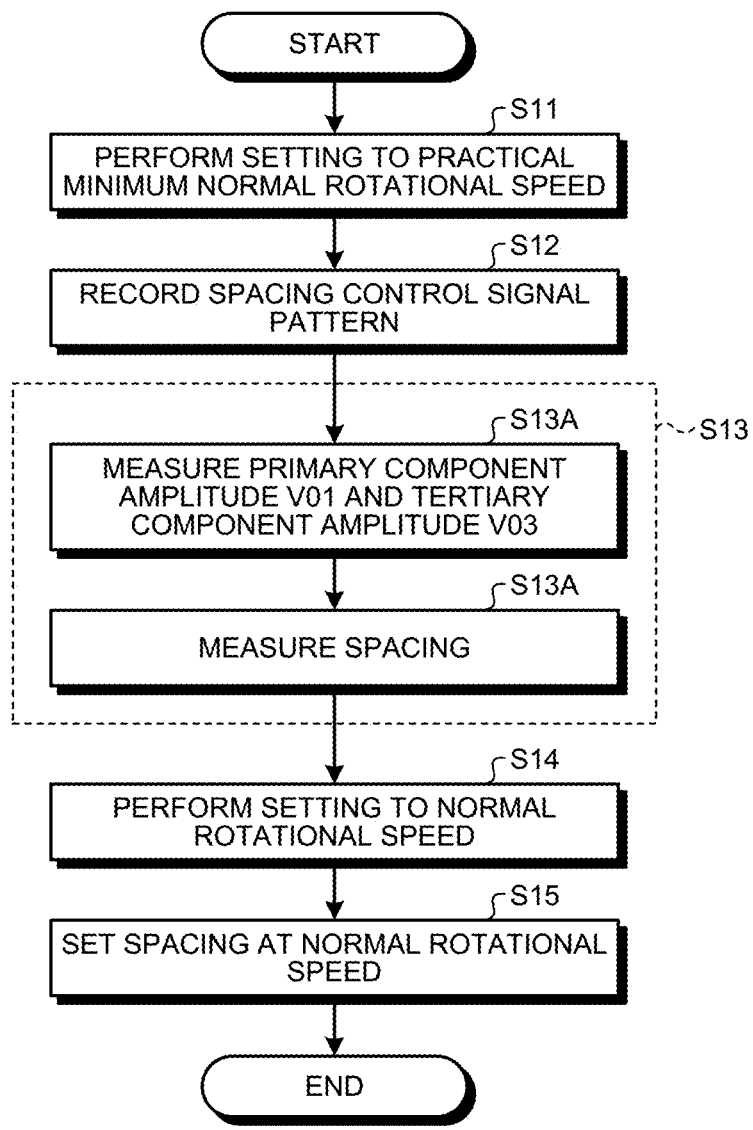
FIG. 6 is an operation flowchart at the time of gap setting.

FIG. 6 is an operation flowchart at the time of gap setting.

First, the rotational speed of the recording medium is set to a preset practical minimum normal rotational speed (Step S11).

In this state, the control amounts of the thermal actuators are reduced by a certain amount and appropriate spacing is provided between the reproducing head/main magnetic pole gap installation portion and the recording medium, and then a signal pattern of spacing control, such as a single pattern of 1T or 2T or a pattern combining the both is recorded on the recording medium (Step S12).

This signal pattern is read on the basis of the contact state, and then reading is performed while the control amounts of the thermal actuators are reduced, that is, while the spacing is increased, whereby a change in the spacing from the reference state is measured (Step S13).

Specifically, with reference to primary component amplitude V01 and tertiary component amplitude V03 in a contact state of a spacing measurement pattern, primary component amplitude V11 and tertiary component amplitude V13 of a reproduction signal are measured while the heater power control amounts of the thermal actuators are reduced (Step S13A).

Figure 7:
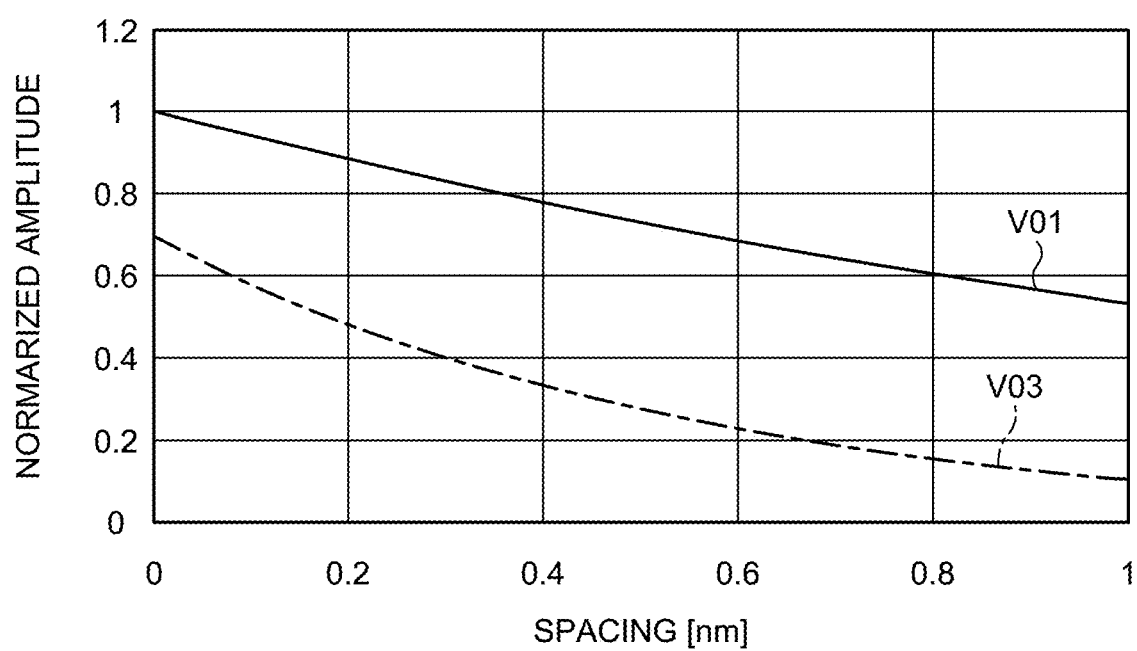
FIG. 7 is a graph for describing an example of a correspondence relationship between a spacing change amount, and primary component amplitude V01 and tertiary component amplitude V03 in a contact state of a spacing measurement pattern.

FIG. 7 is a view for describing an example of a correspondence relationship between a spacing change amount, and the primary component amplitude V01 and the tertiary component amplitude V03 in the contact state of the spacing measurement pattern.

In FIG. 7, a vertical axis represents normalized component amplitude, and a horizontal axis represents a spacing amount.

As illustrated in FIG. 7, the primary component amplitude V01 in the contact state of the spacing measurement pattern is constantly larger than the tertiary component amplitude V03 in the contact state of the spacing measurement pattern in the same spacing.

In addition, it can be understood that the amplitude of the primary component amplitude V01 and the tertiary component amplitude V03 becomes smaller as the spacing becomes larger.

Thus, it is possible to set desired spacing by performing spacing measurement using the following expression 1 (Step S13B) and determining a heater power control amount with which the desired spacing is acquired.

$$\Delta d = \frac{\lambda}{4\pi}\left(\ln\frac{V_{11}}{V_{13}} - \ln\frac{V_{01}}{V_{03}}\right) \qquad \text{expression (1)}$$

Here,

Δd: spacing change amount, and

λ: wavelength of fundamental frequency.

Then, the rotational speed is set to a normal rotational speed (such as 7,200 RPM) (Step S14). In this case, there is a case where the spacing between the flying slider and the recording medium changes due to an increase in the rotational speed. As a result, there is a possibility that the spacing between the reproducing head/main magnetic pole gap installation portion element and the recording medium changes.

Thus, the thermal actuator control amounts with which the spacing change amount Δd becomes 0 are calculated by utilization of the expression 1 with the primary component amplitude V01 and the tertiary component amplitude V03 in the spacing set at the practical minimum rotational speed (5,400 RPM in a case of the above example) and with the primary component of the reproduction signal of the flying control pattern at the normal rotational speed (7,200 RPM in the above example) being V11 and the tertiary component thereof being V13, whereby desired spacing setting is performed at the normal rotational speed (Step S15).

This makes it possible to avoid contact of the reproducing head and the recording head with the recording medium at the normal rotational speed.

In the above description, an influence of a frequency characteristic of an amplifier that amplifies the reproduction signal has not been described. However, in a case where amplitude of signals with different rotational speeds is observed, it is considered that the influence of the frequency characteristic of the amplifier is received.

Thus, it is possible to further improve accuracy by grasping a Gain value for each frequency in advance, calculating amplitude in consideration thereof, and performing the spacing change measurement by using the expression (1).

More specifically, for example, in a case of an amplifier output A01 at the practical minimum rotational speed and an amplifier output A11 at the normal rotational speed of the primary component amplitude in the amplifier output, a gain G01=A01/A11 is defined.

Furthermore, also in the tertiary component amplitude, in a case of an amplifier output A03 at the practical minimum rotational speed and an amplifier output A13 at the normal rotational speed, when a gain G03=A03/A13 is defined, an expression 2 acquired by transformation of the expression 1 can be expressed as the following expression.

$$\Delta d = \frac{\lambda}{4\pi}\left(\ln\frac{G_{01}V_{11}}{G_{03}V_{13}} - \ln\frac{V_{01}}{V_{03}}\right) \quad \text{expression (2)}$$

Thus, it is possible to perform desired spacing setting at the normal rotational speed in consideration of the frequency characteristic of the amplifier by calculating the thermal actuator control amounts, with which the spacing change amount Δd becomes 0, by using the primary component amplitude V01 and the tertiary component amplitude V03 in the spacing set at the practical minimum rotational speed (5,400 RPM in the above example), the primary component V11 and the tertiary component amplitude V13 of the reproduction signal of the flying control pattern at the normal rotational speed (7,200 RPM in the above example), the gains G01 and G03, and the expression 2.

This makes it possible to avoid contact of the reproducing head and the recording head with the recording medium at the normal rotational speed.

The control device (main controller) of the present embodiment includes a control device such as a CPU and a storage device such as a read only memory (ROM) and a RAM, and has a hardware configuration using a normal computer.

The program executed by the control device of the present embodiment is provided by being recorded as a file in an installable format or executable format in a computer-readable recording medium such as a semiconductor memory device.

In addition, the program executed by the control device of the present embodiment may be stored on a computer connected to a network such as the Internet, and provided by being downloaded via the network. In addition, the program executed by the control device of the present embodiment may be provided or distributed via a network such as the Internet.

In addition, the program of the control device of the present embodiment may be provided by being incorporated in a ROM or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a head structure comprising a reproducing head and a main magnetic pole gap installation portion behind a flying slider and including at least two thermal actuators; and
a control unit that can independently control the at least two thermal actuators, and that sets spacing of the reproducing head and the main magnetic pole gap installation portion with respect to a recording medium by setting a rotational speed at a time of contact, the rotational speed being a rotational speed of the recording medium, to be lower than a normal rotational speed when the reproducing head and the main magnetic pole gap installation portion are brought into contact with the recording medium, wherein
the control unit sets the spacing by using harmonic amplitude of a signal, the signal being previously recorded in the recording medium, at the rotational speed at the time of the contact of the reproducing head and the main magnetic pole gap installation portion, and
the control unit measures a spacing change amount Δd by using a following expression (1) on a basis of primary component amplitude V01 and tertiary component amplitude V03 in a contact state of a spacing measurement pattern, and primary component amplitude V11 and tertiary component amplitude V13 of a reproduction signal, $$\Delta d = \frac{\lambda}{4\pi}\left(\ln\frac{V_{11}}{V_{13}} - \ln\frac{V_{01}}{V_{03}}\right) \quad \text{expression (1)}$$

here, λ is a wavelength of a fundamental frequency.

2. The magnetic disk device according to claim 1, wherein the control unit performs control in such a manner that the spacing change amount Δd becomes 0.

3. The magnetic disk device according to claim 1, wherein the control unit measures a spacing change amount Δd by using a following expression (2) on a basis of primary component amplitude V01 and tertiary component amplitude V03 in a contact state of a spacing measurement pattern, primary component amplitude V11 and tertiary component amplitude V13 of a reproduction signal, a gain G01, and a gain G03, $$\Delta d = \frac{\lambda}{4\pi}\left(\ln\frac{G_{01}V_{11}}{G_{03}V_{13}} - \ln\frac{V_{01}}{V_{03}}\right) \quad \text{expression (2)}$$

here, λ is a wavelength of a fundamental frequency,
the gain G01=A01/A11 is defined
as the gain G01 in a case of an amplifier output A01 at the rotational speed at the time of the contact and an amplifier output A11 at the normal rotational speed of primary component amplitude in an amplifier output, and
the gain G03=A03/A13 is defined
as the gain G03 in a case of an amplifier output A03 at the rotational speed at the time of the contact and an amplifier output A13 at the normal rotational speed of tertiary component amplitude in the amplifier output.

4. The magnetic disk device according to claim 3, wherein the control unit performs control in such a manner that the spacing change amount Δd becomes 0.

5. A control method of a magnetic disk device that includes a head structure comprising a reproducing head and a main magnetic pole gap installation portion behind a flying slider and including at least two thermal actuators, and a control unit that can independently control the at least two thermal actuators, the control method comprising:
   setting, when bringing the reproducing head and the main magnetic pole gap installation portion into contact with a recording medium, a rotational speed at a time of contact, the rotational speed being a rotational speed of the recording medium, to be lower than a normal rotational speed in a state of being capable of independently controlling the at least two thermal actuators; and
   setting spacing of the reproducing head and the main magnetic pole gap installation portion with respect to the recording medium at the rotational speed at the time of the contact, wherein
   setting of the spacing is performed by utilization of harmonic amplitude of a signal, the signal being previously recorded in the recording medium, at the rotational speed at the time of the contact of the reproducing head and the main magnetic pole gap installation portion, and
   in setting of the spacing, a spacing change amount Δd is measured by utilization of a following expression (1) on a basis of primary component amplitude V01 and tertiary component amplitude V03 in a contact state of a spacing measurement pattern, and primary component amplitude V11 and tertiary component amplitude V13 of a reproduction signal, $$\Delta d = \frac{\lambda}{4\pi}\left(\ln\frac{V_{11}}{V_{13}} - \ln\frac{V_{01}}{V_{03}}\right) \quad \text{expression (1)}$$

here, λ is a wavelength of a fundamental frequency.

6. The control method of a magnetic disk device according to claim 5, wherein
in setting of the spacing, control is performed in such a manner that the spacing change amount Δd becomes 0.

7. The control method of a magnetic disk device according to claim 5, wherein
in setting of the spacing, the spacing change amount Δd is measured by utilization of a following expression (2) on a basis of primary component amplitude V01 and tertiary component amplitude V03 in a contact state of a spacing measurement pattern, primary component amplitude V11 and tertiary component amplitude V13 of a reproduction signal, a gain G01, and a gain G03, $$\Delta d = \frac{\lambda}{4\pi}\left(\ln\frac{G_{01}V_{11}}{G_{03}V_{13}} - \ln\frac{V_{01}}{V_{03}}\right) \quad \text{expression (2)}$$

here, λ is a wavelength of a fundamental frequency,
the gain G01=A01/A11 is defined
as the gain G01 in a case of an amplifier output A01 at the rotational speed at the time of the contact and an amplifier output A11 at the normal rotational speed of primary component amplitude in an amplifier output, and
the gain G03=A03/A13 is defined
as the gain G03 in a case of an amplifier output A03 at the rotational speed at the time of the contact and an amplifier output A13 at the normal rotational speed of tertiary component amplitude in the amplifier output.

8. The control method of a magnetic disk device according to claim 7, wherein
in setting of the spacing, control is performed in such a manner that the spacing change amount Δd becomes 0.

* * * * *